United States Patent
Dahlman et al.

(10) Patent No.: US 8,861,420 B2
(45) Date of Patent: Oct. 14, 2014

(54) METHOD AND ARRANGEMENT IN A TELECOMMUNICATION SYSTEM

(75) Inventors: Erik Dahlman, Bromma (SE); Yiva Jading, Stockholm (SE); Stefan Parkvall, Stockholm (SE); Niklas Johansson, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 323 days.

(21) Appl. No.: 13/120,034

(22) PCT Filed: Apr. 22, 2009

(86) PCT No.: PCT/SE2009/050416
§ 371 (c)(1),
(2), (4) Date: Mar. 21, 2011

(87) PCT Pub. No.: WO2010/033065
PCT Pub. Date: Mar. 25, 2010

(65) Prior Publication Data
US 2011/0170471 A1    Jul. 14, 2011

(51) Int. Cl.
*H04H 20/71* (2008.01)
*H04L 25/24* (2006.01)
*H04B 7/155* (2006.01)
*H04B 7/26* (2006.01)
*H04W 72/12* (2009.01)
*H04W 84/04* (2009.01)
*H04W 72/14* (2009.01)

(52) U.S. Cl.
CPC .............. *H04B 7/2606* (2013.01); *H04L 25/24* (2013.01); *H04W 84/047* (2013.01); *H04B 7/15528* (2013.01); *H04W 72/14* (2013.01); *H04W 72/1231* (2013.01)
USPC .......................................... 370/312; 370/252

(58) Field of Classification Search
USPC ....................................................... 370/312
See application file for complete search history.

(56) References Cited

U.S. PATENT DOCUMENTS

| | | | |
|---|---|---|---|
| 2005/0063327 A1* | 3/2005 | Krauss et al. | 370/320 |
| 2009/0252077 A1* | 10/2009 | Khandekar et al. | 370/312 |
| 2010/0067616 A1* | 3/2010 | Chun et al. | 375/295 |

FOREIGN PATENT DOCUMENTS

| | | |
|---|---|---|
| EP | 1677443 A | 7/2006 |
| EP | 1855424 A1 | 11/2007 |
| WO | WO 03/058984 A | 7/2003 |
| WO | WO 2005/022772 A1 | 3/2005 |
| WO | WO 2006/014092 A1 | 2/2006 |
| WO | WO 2008/021724 A | 2/2008 |
| WO | WO 2010-006285 A2 | 1/2010 |

* cited by examiner

*Primary Examiner* — Hassan Kizou
*Assistant Examiner* — Tejis Daya
(74) *Attorney, Agent, or Firm* — Roger S. Burleigh

(57) ABSTRACT

Method and apparatus for avoiding or reducing interference between transmissions from a donor eNB to a relay node and down link transmissions from the relay node to at least one mobile terminal, where the transmissions take place in overlapping frequency bands. In the method, at least one interruption is created in a transmission from the relay node to the mobile terminal (s), and during the created interruption, a transmission from the donor eNB is received. This may result in an improved reception of the transmission from the eNB in the relay node.

21 Claims, 7 Drawing Sheets

METHOD AND ARRANGEMENT IN A TELECOMMUNICATION SYSTEM

This application claims the benefit of U.S. Provisional Application No. 61/098,367, filed Sep. 19, 2008, the disclosure of which is fully incorporated herein by reference.

TECHNICAL FIELD

The invention relates to a method and an arrangement in a telecommunication system, in particular to enable backwards compatible self-backhauling in an E-UTRAN (Evolved Universal Terrestrial Radio Access Network).

BACKGROUND

In certain situations it may be advantageous to extend the radio coverage of a cellular telecommunication system by using a wireless relay node, which is connected to a base station. The relay node may constitute one or more cells of its own, or may be used to extend the cells covered by the base station.

In e-UTRAN (Evolved Universal Terrestrial Radio Access Network), also known as LTE, self-backhauling is one of the relaying techniques which are considered to be included in the radio access network standard. The concept of self-backhauling implies that a wireless base station is wirelessly connected to the remaining part of a network via another cell, sometimes called the anchor cell, here referred to as the donor cell. The donor cell is controlled by an eNB (evolved Node B), which here will be referred to as the donor eNB or donor node. The donor eNB may also be called the anchor eNB. The wireless eNB will here be referred to as the relay node (RN) or relay. The relay may also be called the self-backhauled eNB or the s-eNB.

The use of wireless backhaul to a base station by means of, for example, a specific radio-link technology such as MiniLink, sometimes also called micro wave, has been used for many years. These specific technologies may, however, require additional transceiver equipment or specific, dedicated frequency bands to operate in, and may also require line-of-sight conditions.

The concept of self-backhauling also implies that the link between the donor eNB and the relay node, here referred to as the self-backhaul link, should be possible to operate in the same frequency spectrum, i.e. frequency-overlapped with, the radio access links that provide access for mobile terminals, also known as User Equipment (UEs), within the donor cell and the UEs within the cell(s) controlled by the relay node. It is also typically assumed that the radio technology used for the self-backhaul link is basically similar to the one used within the donor cell and the cell(s) of the relay node respectively, possibly with some additional extensions to optimize for the backhaul application. For example, in case the donor eNB and the relay node use the LTE radio access technology for communicating with UEs within their cell(s), the self-backhaul link should also be LTE-based, or at least based on an LTE-like radio technology. Signals which overlap in frequency interfere with each other, which may obstruct reception of the signals.

SUMMARY

As it is desirable to obtain a satisfactory reception of the self-backhaul link at the relay node the present invention provides a mechanism for enabling avoidance or reduction of the interference which may occur when a self-backhaul link between a donor eNB and a relay node and radio access links within the cell(s) controlled by the relay node operate in the same frequency spectrum. These objects are met by a method and apparatus according to the attached independent claims.

According to one aspect, a method is provided in a relay node in a wireless communication system for avoiding or reducing interference between transmissions from a donor eNB to the relay node and downlink transmissions from the relay node to at least one mobile terminal connected to the relay node. In the method, at least one interruption is created in said transmission from the relay node to the mobile terminal(s), and a transmission is received from the donor eNB during said at least one created interruption.

According to another aspect, a relay node is provided in a wireless communication system, and adapted to avoid or reduce interference between transmissions from a donor eNB to the relay node and downlink transmissions from the relay node to at least one mobile terminal connected to the relay node. The relay node comprises an interference avoiding unit, which is adapted to create at least one interruption in the transmission from the relay node to the mobile terminal(s). The relay node further comprises a receiving unit, which is adapted to receive a transmission from the donor eNB during the interruption(s).

According to yet another aspect, a donor eNB connected to a relay node, such as the one described earlier in a wireless communication system, is adapted to avoid or reduce interference between transmissions from the donor eNB to the relay node and downlink transmissions from the relay node to at least one mobile terminal connected to the relay node. The donor eNB comprises a time-shifting unit which is adapted to shift subframes destined for the relay node one or more OFDM symbol durations in time relative to the relay node downlink subframes. The donor eNB further comprises a transmitting unit, which is adapted to transmit the time-shifted subframes or other subframes to the relay node.

According to yet another aspect, an arrangement is provided and adapted to avoid or reduce interference in a wireless communication system. The arrangement comprises an eNB controlling a donor cell, and a relay node. When at least one mobile terminal connected to the relay node, the relay node is configured to create at least one interruption in a transmission to the mobile terminal(s), and to receive a transmission from the eNB controlling the donor cell during the interruption(s).

In the different aspects above, the transmissions from the donor eNB to the relay node and the downlink transmissions from the relay node to the mobile terminal(s) take place in overlapping frequency bands, which is one reason why these transmissions can interfere with each other.

Various embodiments are possible for the method, nodes and arrangement described above. In one exemplary embodiment, the transmission interruption is created by using a downlink transmission subframe format that is known to legacy mobile terminals. When the format is known to legacy users, the embodiment is backwards compatible and may be used by both legacy users and other users, which is an advantage since it may take some time before all users have changed their legacy equipment to a new or upgraded version after a system upgrade.

In another embodiment, the interruption could be created by using a downlink transmission subframe format, in which the subframe contents are limited to reference symbols and control signalling, which are allocated in less than 3 OFDM symbols of the subframe. The interruption could also be created by using the MBSFN-subframe format, which is also known to legacy mobile terminals, therefore not requiring modification of the legacy mobile terminals.

In one embodiment, the subframes of the transmission from the donor eNB to the relay node are time-shifted one or more OFDM symbol durations relative to the downlink subframes. This embodiment can enable avoidance or reduction of interference between the first part of the subframes of the radio access link and selected parts of the subframes of self-backhaul link. The number of OFDM symbol durations of the time shift may for example be selected based on the duration of a control region used in the subframes within the cells of the relay node. Thereby, the first part of the subframes of the self-backhaul link will basically not be subject to interference from the first part of the subframes of the radio access link, which may improve the performance. However, some other part, e.g. the last part, of the subframes of the self-backhaul link will be subject to interference instead.

Further, in one embodiment, a last part of at least one subframe of the transmission from the donor eNB to the relay node could be left unused for transmission. This embodiment can enable further avoidance or reduction of interference between the self-backhaul link and the radio access links. The time length of the unused part may for example depend on the number of OFDM symbol durations of a time shift of the subframe.

For any of the embodiments, the number of created downlink transmission interruptions can vary from several interruptions per radio frame to less than one interruption per radio frame.

In one embodiment, it is the relay node that decides at which point in time the interruptions should be created and that informs the concerned mobile terminals of during which time interval an interruption will be created in the downlink transmission. If necessary, the relay node also informs the donor eNB of during which time interval an interruption will be created in the downlink transmission. It may not be necessary to inform the eNB if the relay node knows or is able to predict when the donor eNB will transmit on the self-backhaul link.

In another embodiment, it is the donor eNB that decides at which point in time the interruptions should be created and informs the relay node about when the relay node should create interruptions. In that case, the relay node informs the concerned mobile terminals of during which time interval an interruption will be created in the downlink transmission.

The different features of the exemplary embodiments above may be combined in different ways according to need, requirements or preference.

BRIEF DESCRIPTION OF THE DRAWINGS

The invention will now be explained in more detail by means of exemplary embodiments and with reference to the accompanying drawings, in which.

DETAILED DESCRIPTION

The invention can be used to avoid or reduce interference between transmissions over a self-backhauling link and transmissions between one of the nodes connected to the self-backhaul link and the UEs served by the cell(s) controlled by said node.

The invention is particularly useful where the transmissions, at least partly, take place in the same frequency spectrum and where it is desired that the communication is backwards compatible for legacy UEs, i.e. UEs communicating according to an earlier version of a transmission standard or protocol or the like. The present invention may also be used to avoid or reduce interference in other, similar situations.

It may be desirable for network operators to use the same or overlapping frequency bands for the self-backhaul link and for the communication within the cells of the donor and/or the relay node, for several reasons. One of the reasons is that the need for access to any additional frequency bands, dedicated to the backhaul link, it set aside. Acquiring additional frequencies may not be possible or may be expensive. Further, the need for additional frequency-specific or link-specific equipment, dedicated for communication over the backhaul link, is reduced. Further, the use of self-backhauling may also enable non line-of-sight transmission, which may be useful in many situations.

Figure 1:
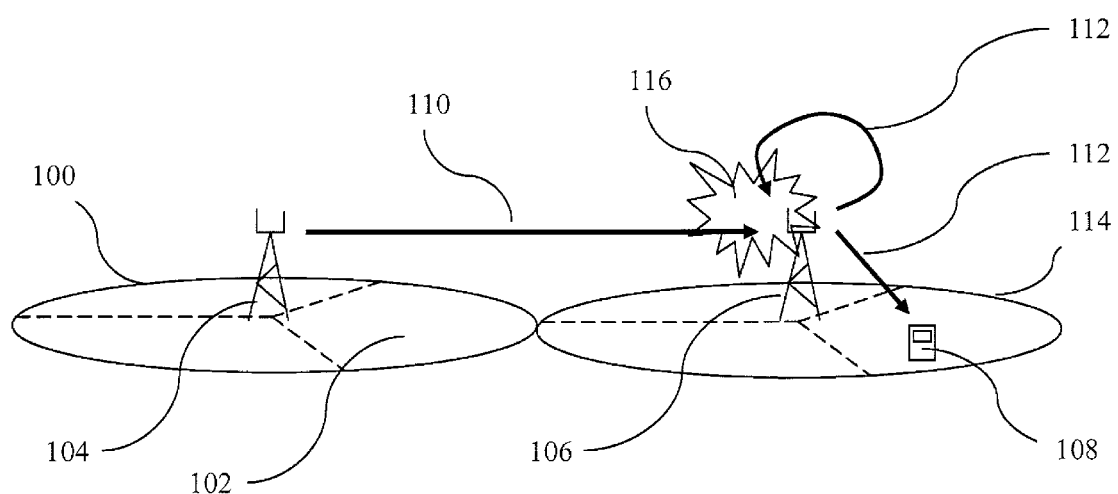
FIG. 1 is a schematic view illustrating a self-backhaul link being subject to interference.
Figure 2:
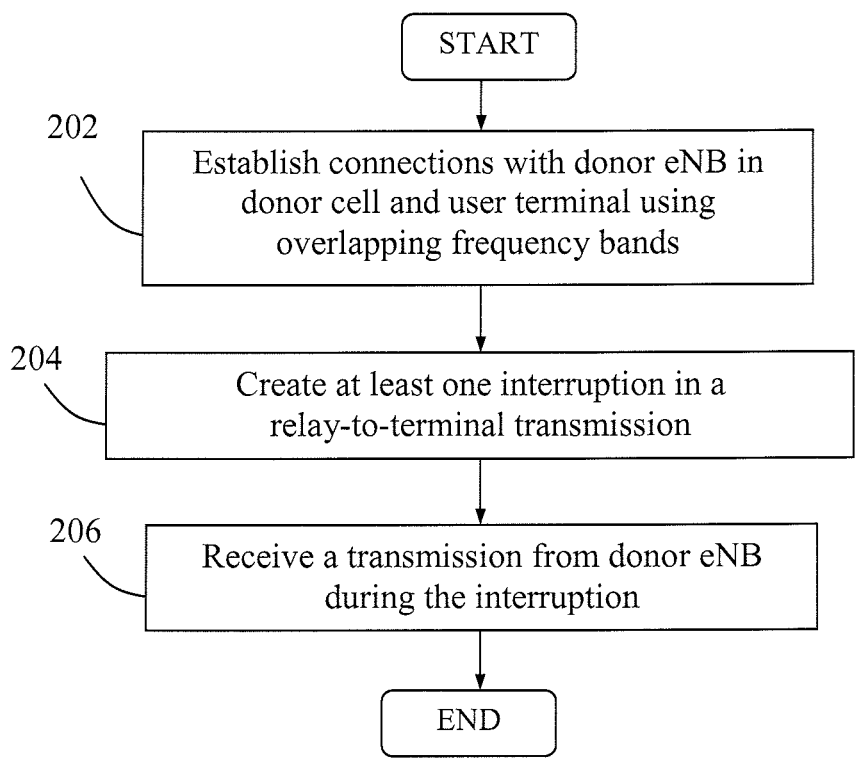
FIG. 2 is a flow chart illustrating an embodiment of procedure steps in a relay node for avoiding or reducing interference.

The invention addresses the problem of the interference which would most likely occur when overlapping frequency bands are used for the self-backhaul link and for the relay-to-UE transmissions within the cell(s) controlled by the relay node respectively. This problem is illustrated in FIG. 1 as follows:

A donor eNB 104 transmits to a relay node 106 on a self-backhaul link 110 at the same time as the relay transmits to a UE 108 within one of its own cells. The relay node then "overhears" its own transmission 112 to the UE, which "overheard" transmission 112 then interferes 116 with the incoming transmission from the donor cell. This results in that the relay node may not be able to detect the incoming transmission from the donor cell properly, and thereby may fail to secure important information.

The above described interference can, however, be avoided by inserting transmission interruptions in the downlink transmission 112 from the relay node 106 to the UE 108. These interruptions can be regarded as "holes" or "gaps" of a certain duration in the transmission, during which "holes" or "gaps" the relay may receive incoming transmissions on the self-backhaul link 110 without severe interference from the downlink transmissions 112 within the cell(s) controlled by the relay. This can also be described as time multiplexing between the self-backhaul link and the access link in the cell(s) of the relay node.

Transmission interruptions can be implemented in different ways. However, it is highly desirable to make the implementation backwards compatible for legacy UEs, i.e. fully aligned with downlink transmission schemes as defined in earlier versions of a transmission protocol, as for example in Release 8 of the 3GPP-specifications for the LTE standard, where the interference problem described above did not occur, since no self-backhaul links were considered in that version.

Backwards compatibility enables legacy UEs to act according to a previous version of the transmission protocol, and still be able to communicate with UEs and nodes which act according to a more recent, considerably changed version of the transmission protocol, e.g. Release 10 of the 3GPP-specifications for the LTE standard. In a backwards compatible system, the legacy UEs do not necessarily have to "be aware" of the new version or be upgraded or adapted to the new version, which is an advantage.

Therefore, the interruptions in the downlink should preferably be created in a way which is backwards compatible for legacy UEs. The challenge with this is that the legacy UEs expect a certain format in the downlink transmissions, which should not be diverged from. Changing the expected format would require changes to be made in the earlier version of the transmission protocol, which is troublesome and undesirable.

Figure 3A:
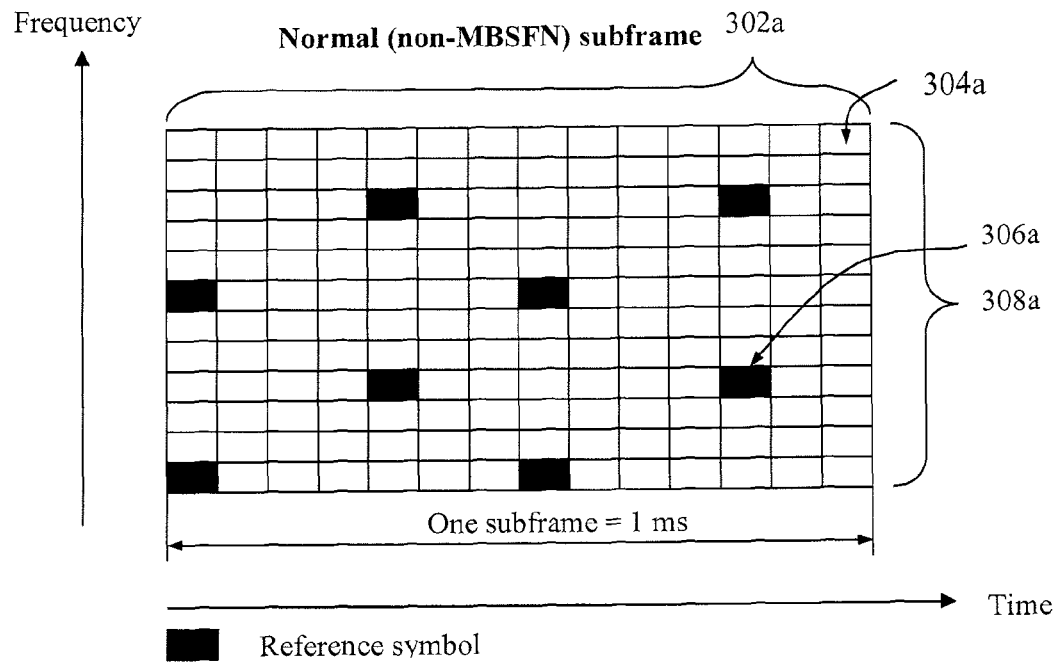
FIGS. 3-4 illustrate different subframe structures, which can be used in the described embodiments.

An ordinary LTE Release 8 subframe is illustrated in FIG. 3a. This is the subframe format which is normally expected by the legacy UEs. An LTE-subframe has a duration of 1 ms, which typically equals the duration of 14 OFDM symbols (Orthogonal Frequency Division Multiplexing). Typically, the first 1-3 OFDM symbols of the subframe are used for control information. Further, in these ordinary unicast subframes there are several mandatory reference symbols, e.g. evenly distributed over the frequency-time-grid. These reference symbols may be used by a receiving unit, e.g. for estimating the channels over which the transmitted symbols propagate.

In one embodiment, the interruptions in the relay downlink transmission are created by the use of MBSFN-subframes (Multicast/Broadcast Single Frequency Network). Certain downlink subframes are then defined as being MBSFN-subframes.

The MBSFN-subframes are known to legacy UEs, e.g. Release 8, but are known to be used in a very different situation, i.e. for MBSFN-transmissions.

Figure 3B:
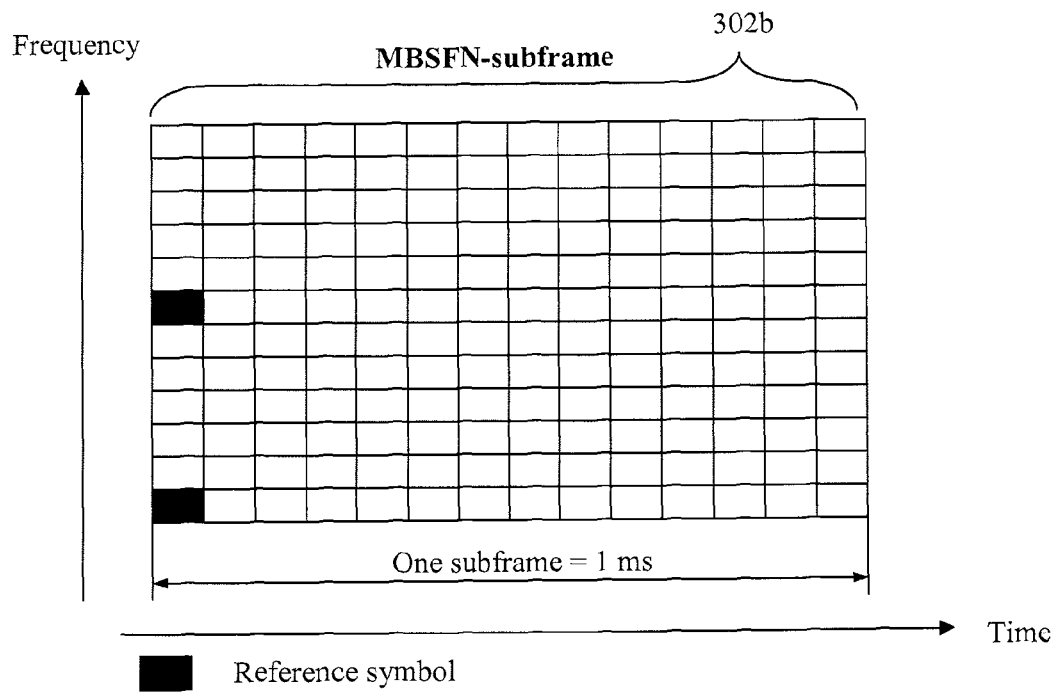
Figure 4:
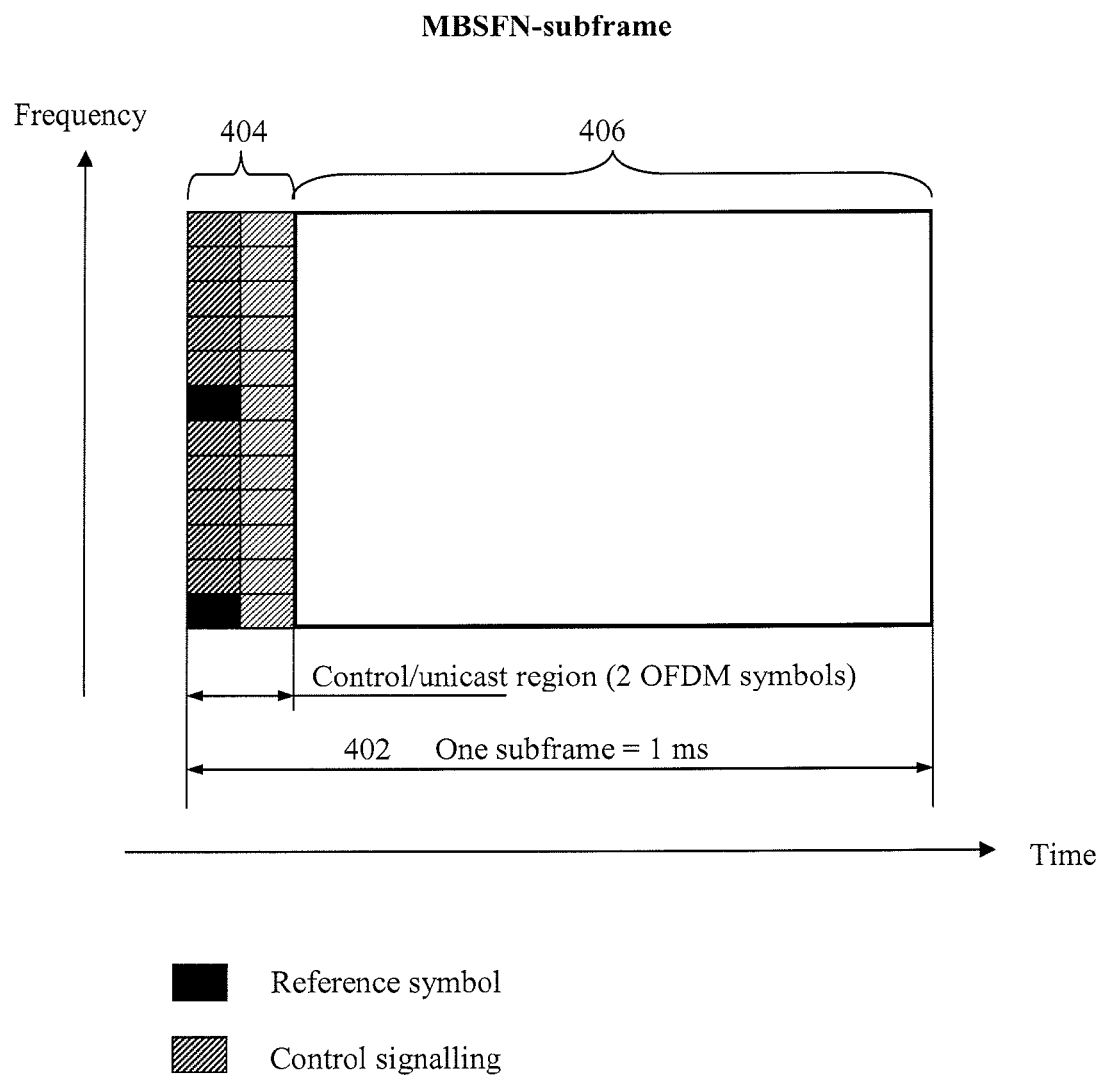

An MBSFN-subframe is illustrated in FIG. 3b and FIG. 4. Typically, the first two OFDM-symbols of an MBSFN-subframe are defined to comprise reference symbols and control information. These two first symbols constitute the [cell specific] control region, or unicast region. The contents of the remaining part of the MBSFN-subframe are not specified. This means that it is possible to leave out the distributed reference symbols, which are mandatory in ordinary LTE-downlink-subframes. Thereby, a major part 406 of the MBSFN-subframe may be left empty, i.e. left unused for transmission. This empty part 406 of the MBSFN-subframe may be regarded as a transmission interruption or a "hole" or "gap" in the transmission for a certain time interval. This interruption or pause in the downlink transmission gives the relay an opportunity to receive a transmission from the donor eNB during the corresponding time interval, without suffering from interference from the downlink.

The unicast region 404, comprises reference symbols in the first OFDM-symbol of the subframe in the case of 2-antenna-port transmission, and in the first and second OFDM-symbol of the subframe in the case of 4-antenna-port transmission. In addition to containing the reference symbols, this region is also completely or partly used for L1/L2 control signalling, i.e. HARQ (Hybrid Automatic Repeat reQuest) acknowledgements and scheduling grants. If not told otherwise, the legacy UEs will ignore all but the unicast region of the MBSFN-subframes.

The number of downlink subframes that are defined as MBSFN-subframes can vary from several subframes per frame to less than one subframe per frame, e.g. one subframe every fourth frame. The number of MBSFN-subframes may for example vary in accordance with the amount of communication on the self-backhauling link. In general, one frame or radio frame comprises 10 subframes.

In one embodiment, the relay node decides which subframes that are suitable to be defined as MBSFN-subframes. The relay node then communicates to the donor eNB and the concerned UEs at which point in time the MBSFN-subframes will be transmitted on the downlink. Thereby, the donor eNB "knows" during which time interval it is advantageous/suitable to transmit to the relay on the self-backhaul link.

In another embodiment of the present invention, the donor eNB decides when to transmit to the relay node on the self-backhaul link and which subframes that should be defined as MBSFN-subframes in the relay node. The donor eNB then communicates to the relay node at which point in time to transmit MBSFN-subframes on the downlink, and the relay node informs the UEs about the MBSFN-subframes. The relay then "knows" during which time interval or at which point in time to expect transmissions on the self-backhauling link, since the donor eNB transmits on the self-backhauling link during the time interval corresponding to the relay downlink transmission of the MBSFN-subframes.

In another embodiment, the occurrences of transmissions from the donor eNB on the self-backhaul link are known or predictable to the relay node. For example, they may be scheduled in a certain way, which is known to the relay node or can be predicted by the relay node. The relay node may then adapt to the transmissions from the donor eNB by inserting MBSFN-subframes in the downlink when an incoming transmission on the self-backhaul link is expected. The relay node also informs the UBs of at which point in time to expect MBSFN-subframes. In this embodiment, the donor eNB may be unaware of the insertion of MBSFN-subframes.

Figure 5:
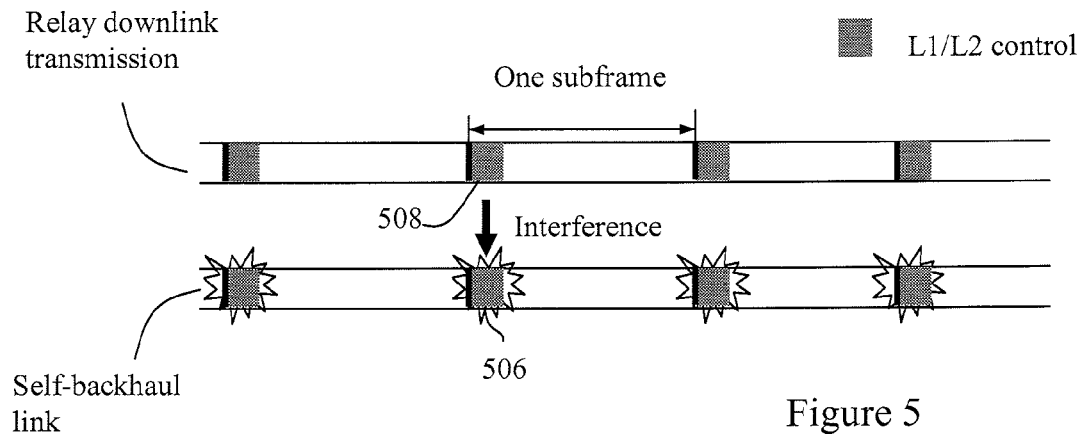
FIGS. 5-7 illustrate embodiments of inter-link relations when using embodiments of the described procedure for avoiding or reducing interference.

In cases when both the self-backhaul link and the RN-to-UE links are LTE-based and have the same subframe structure, the control region of the relay downlink transmissions 508 will severely interfere with the corresponding part 506 of the self-backhaul transmission as illustrated in FIG. 5. This could be a problem, especially when the corresponding part of the self-backhaul transmission is considered to be particularly important. To avoid or reduce this interference between the first parts of the subframes, the self-backhaul link can be staggered in time, i.e. time-shifted, as outlined in FIG. 6. If the length of the control region 608 in the subframes transmitted on the relay downlink is one OFDM-symbol, the staggering 604 should be at least one OFDM-symbol duration. Similarly, if the length of the control region 608 in the subframes transmitted on the relay node downlink is two OFDM-symbols, the staggering 604 should be at least two OFDM-symbol durations.

The use of staggering will avoid or reduce the interference problem in the first part of the subframes on the self-backhaul link, but it will move the interference to another part of the subframe. For example, the last part 606 of a subframe on the self-backhauling link may be severely interfered by a subsequent subframe transmission within the cell(s) of the relay.

Figure 7:
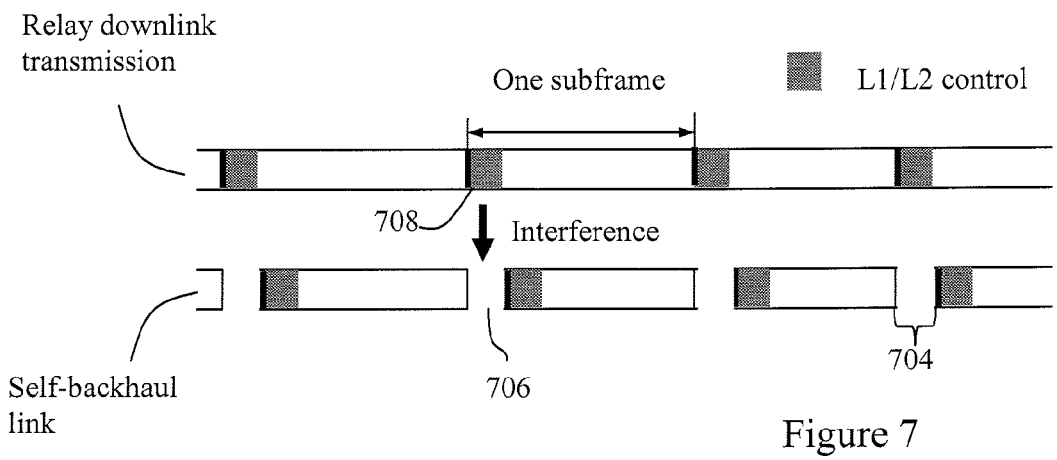

The above described interference can be avoided in another possible embodiment, illustrated in FIG. 7. When the interference from the relay downlink occurs in the last part of the subframes of the self-backhaul link, the subframe length may be shortened on the self-backhaul link in order to avoid or reduce the interference. In other words, the length of the subframes may depend on the amount of staggering 704, which in turn may depend on e.g. the length of the unicast region 708 in the subframes of the relay downlink. Thus, the donor eNB refrains from transmitting on the self-backhaul link during said last part 706 of a regular subframe duration, as illustrated in FIG. 7.

Alternatively, the donor eNB transmits also during the last part of the subframe on the self-backhaul link and it is assumed that the channel coding applied to the self-backhaul link will be sufficient to overcome the interference.

Figure 6:
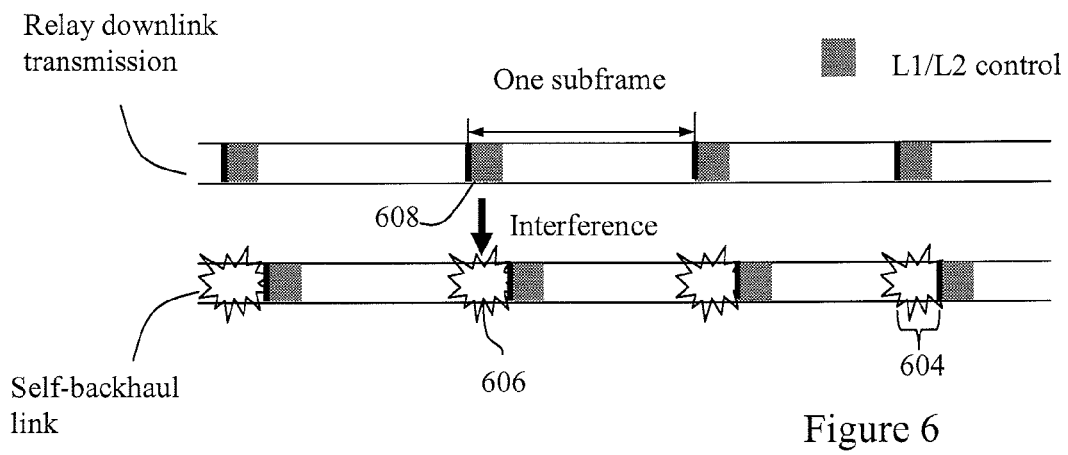

FIGS. 5-7 show a plurality of consecutive MBSFN-subframes and "self-backhaul-subframes", which are partially subject to interference. However, the creation of interruptions in the downlink and the transmission on the self-backhauling link is not limited to this scenario, as stated earlier. The number of downlink subframes which comprise an interruption can vary from several subframes per frame to less than one subframe per frame. The number of subframes received from the donor eNB on the self-backhaul link may vary in a corresponding way.

Figure 8:
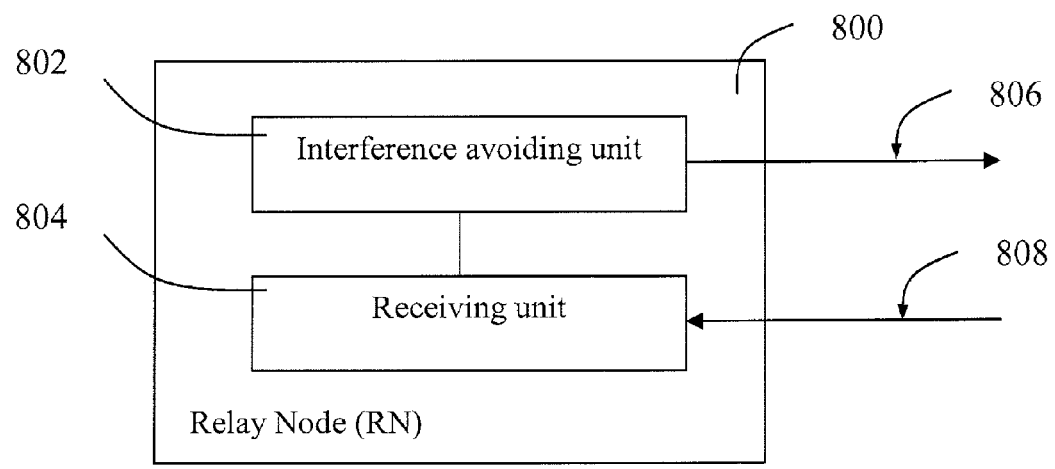
FIGS. 8-9 are block diagrams illustrating embodiments of a relay node and a donor eNB.

FIG. 8 illustrates a relay node 800 in a wireless communication system according to one embodiment. The relay node 800 is adapted to avoiding or reducing interference between transmissions 808 from a donor eNB to the relay node and downlink transmissions 806 from the relay node 800 to at least one mobile terminal (not shown) connected to the relay node. The relay node 800 comprises an interference avoiding unit 802, which is adapted to create at least one interruption in the transmission 806 from the relay node 800 to the mobile terminal(s). The relay node 800 further comprises a receiving unit 804, which is adapted to receive a transmission 808 from the donor eNB during the interruption(s).

Figure 9:
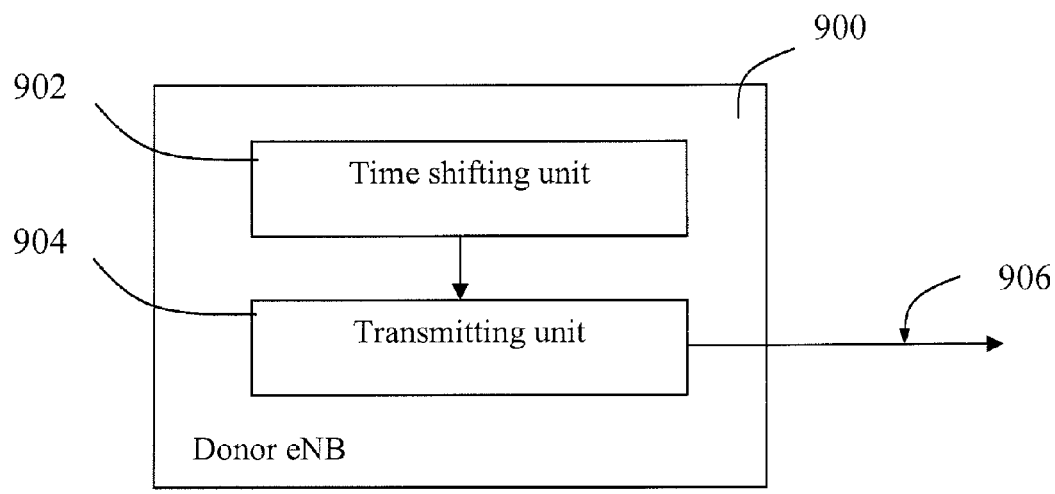

FIG. 9 illustrates a donor eNB 900, which is connected to a relay node (not shown) in a wireless communication system according to one embodiment. The donor eNB 900 is adapted to avoid or reduce interference between transmissions 906 from the donor eNB to the relay node and downlink transmissions (not shown) from the relay node to at least one mobile terminal (not shown) connected to the relay node. The donor eNB comprises a time-shifting unit 902, which is adapted to shift subframes destined for the relay node one or more OFDM symbol durations in time relative to the relay node downlink subframes. The donor eNB 900 further comprises a transmitting unit 904, which is adapted to transmit the time-shifted subframes or other subframes to the relay node.

It should be noted that FIGS. 8 and 9 merely illustrate various functional units in the relay node 800 and the eNB 900 in a logical sense. However, the skilled person is free to implement these functions in practice using any suitable software and hardware means. Thus, the invention is generally not limited to the shown structure of the relay node 800 and the eNB 900.

Figure 10:
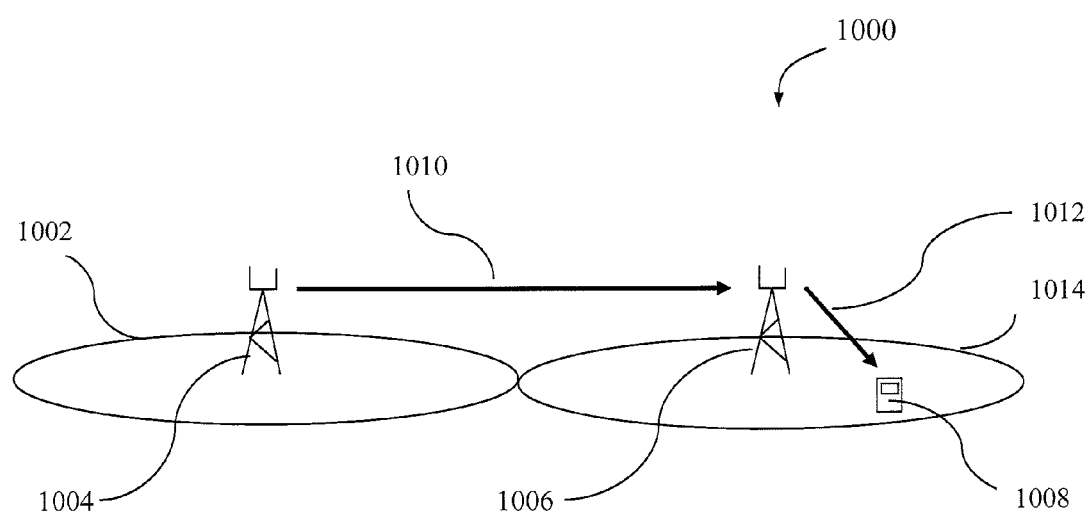
FIG. 10 is a schematic view illustrating an arrangement according to one embodiment.

FIG. 10 illustrates an arrangement 1000 according to one embodiment. The arrangement 1000 is adapted to avoiding or reducing interference in a wireless communication system. The arrangement comprises an eNB 1004 controlling a donor cell 1002, and a relay node 1006. When at least one mobile terminal 1008 is connected to the relay node, the relay node is configured to create at least one interruption in a transmission 1012 to the mobile terminal(s) 1008, and to receive a transmission 1010 from the eNB 1004 controlling the donor cell 1002 during the created interruption(s).

The invention claimed is:

1. Method in a relay node in a wireless communication system for avoiding or reducing interference between transmissions from a donor evolved Node B (donor eNB) to the relay node and downlink transmissions from the relay node to at least one mobile terminal connected to the relay node, the method comprising the steps of:
   creating at least one interruption in said downlink transmissions from the relay node to the at least one mobile terminal; and,
   receiving transmissions from the donor eNB during said at least one interruption, wherein said transmissions take place in overlapping frequency bands, and wherein said at least one interruption is created by using a Multicast/Broadcast Single Frequency Network-subframe format, MBSFN-subframe format.

2. The method according to claim 1, wherein said at least one interruption is created by using the MBSFN-subframe format known to legacy mobile terminals (i.e., backwards compatibility enabled mobile terminals).

3. The method according to claim 1, wherein said at least one interruption is created by using the MBSFN-subframe format, in which the subframe contents are limited to reference symbols and control signalling, which are allocated in less than 3 OFDM symbols of the subframe.

4. The method according to claim 1, wherein the subframes of the transmission from the donor eNB to the relay node are time-shifted one or more OFDM symbol durations relative to the downlink subframes.

5. The method according to claim 4, wherein the number of OFDM symbol durations of the time shift is selected based on the duration of a control region used in subframes within the cells of the relay node.

6. The method according to claim 4, wherein a last part of at least one subframe of the transmission from the donor eNB to the relay node is left unused for transmission.

7. The method according to claim 6, wherein the time length of the unused part depends on the number of OFDM symbol durations of the time shift of the subframe.

8. The method according to claim 1, wherein the number of said downlink interruptions can vary from several interruptions per radio frame to less than one interruption per radio frame.

9. The method according to claim 1, wherein the relay node decides at which point in time the interruptions should be created; and, wherein the relay node informs the concerned mobile terminals and, if necessary, the donor eNB of during which time interval an interruption will be created in the downlink transmission.

10. The method according to claim 1, wherein the relay node is informed by the donor eNB of at which point in time the interruptions should be created; and, wherein the relay node informs the concerned mobile terminals of during which time interval an interruption will be created in the downlink transmission.

11. Arrangement adapted to avoid or reduce interference in a wireless communication system comprising:
   an evolved Node B (eNB), controlling a donor cell; and,
   a relay node, wherein when at least one mobile terminal is connected to the relay node, the relay node is configured to:
      create at least one interruption in a transmission to the mobile terminal(s); and,
      receive a transmission from the eNB controlling the donor cell during said at least one interruption, wherein said transmissions take place in overlapping frequency bands, and wherein said at least one interruption is created by using a Multicast/Broadcast Single Frequency Network-subframe format, MBSFN-subframe format.

12. A relay node for us in a wireless communication system for avoiding or reducing interference between transmissions from a donor evolved Node B (donor eNB), to a relay node and downlink transmissions from the relay node to at least one mobile terminal connected to the relay node, comprising:
   at least one processor and at least one memory, wherein the memory contains instructions that, when executed by the processor, cause the relay node to:

create at least one interruption in said downlink transmissions from the relay node to the at least one mobile terminal; and, receive transmissions from the donor eNB during said at least one interruption, wherein said transmissions take place in overlapping frequency bands, and wherein said at least one interruption is created by using a Multicast/Broadcast Single Frequency Network-subframe format, MBSFN-subframe format.

13. The relay node according to claim 12, wherein said at least one interruption is created by using the MBSFN-subframe format known to legacy mobile terminals (i.e., backwards compatibility enabled mobile terminals).

14. The relay node according to claim 12, wherein said at least one interruption is created by using the MBSFN-subframe format, in which the subframe contents are limited to reference symbols and control signalling, which are allocated in less than 3 OFDM symbols of the subframe.

15. The relay node according to claim 12, wherein the subframes of the transmission from the donor eNB to the relay node are time-shifted one or more OFDM symbol durations relative to the downlink subframes.

16. The relay node according to claim 15, wherein the number of OFDM symbol durations of the time shift is selected based on the duration of a control region used in subframes within the cells of the relay node.

17. The relay node according to claim 15, wherein a last part of at least one subframe of the transmission from the donor eNB to the relay node is left unused for transmission.

18. The relay node according to claim 17, wherein the time length of the unused part depends on the number of OFDM symbol durations of the time shift of the subframe.

19. The relay node according to claim 12, wherein the number of said downlink interruptions can vary from several interruptions per radio frame to less than one interruption per radio frame.

20. The relay node according to claim 12, wherein the relay node decides at which point in time the interruptions should be created; and, wherein the relay node informs the concerned mobile terminals and, if necessary, the donor eNB of during which time interval an interruption will be created in the downlink transmission.

21. The relay node according to claim 12, wherein the relay node is informed by the donor eNB of at which point in time the interruptions should be created; and, wherein the relay node informs the concerned mobile terminals of during which time interval an interruption will be created in the downlink transmission.

* * * * *

UNITED STATES PATENT AND TRADEMARK OFFICE
CERTIFICATE OF CORRECTION

| | |
|---|---|
| PATENT NO. | : 8,861,420 B2 |
| APPLICATION NO. | : 13/120034 |
| DATED | : October 14, 2014 |
| INVENTOR(S) | : Dahlman et al. |

It is certified that error appears in the above-identified patent and that said Letters Patent is hereby corrected as shown below:

Specification

In Column 6, Line 28, delete "UBs" and insert -- UEs --, therefor.

Claims

In Column 8, Line 60, in Claim 12, delete "us" and insert -- use --, therefor.

Signed and Sealed this
Fifteenth Day of March, 2016

Michelle K. Lee
*Director of the United States Patent and Trademark Office*